Oct. 8, 1968 W. V. MACK 3,404,427
ADJUSTABLE EXTENSION-HANDLE
Filed Nov. 18, 1966
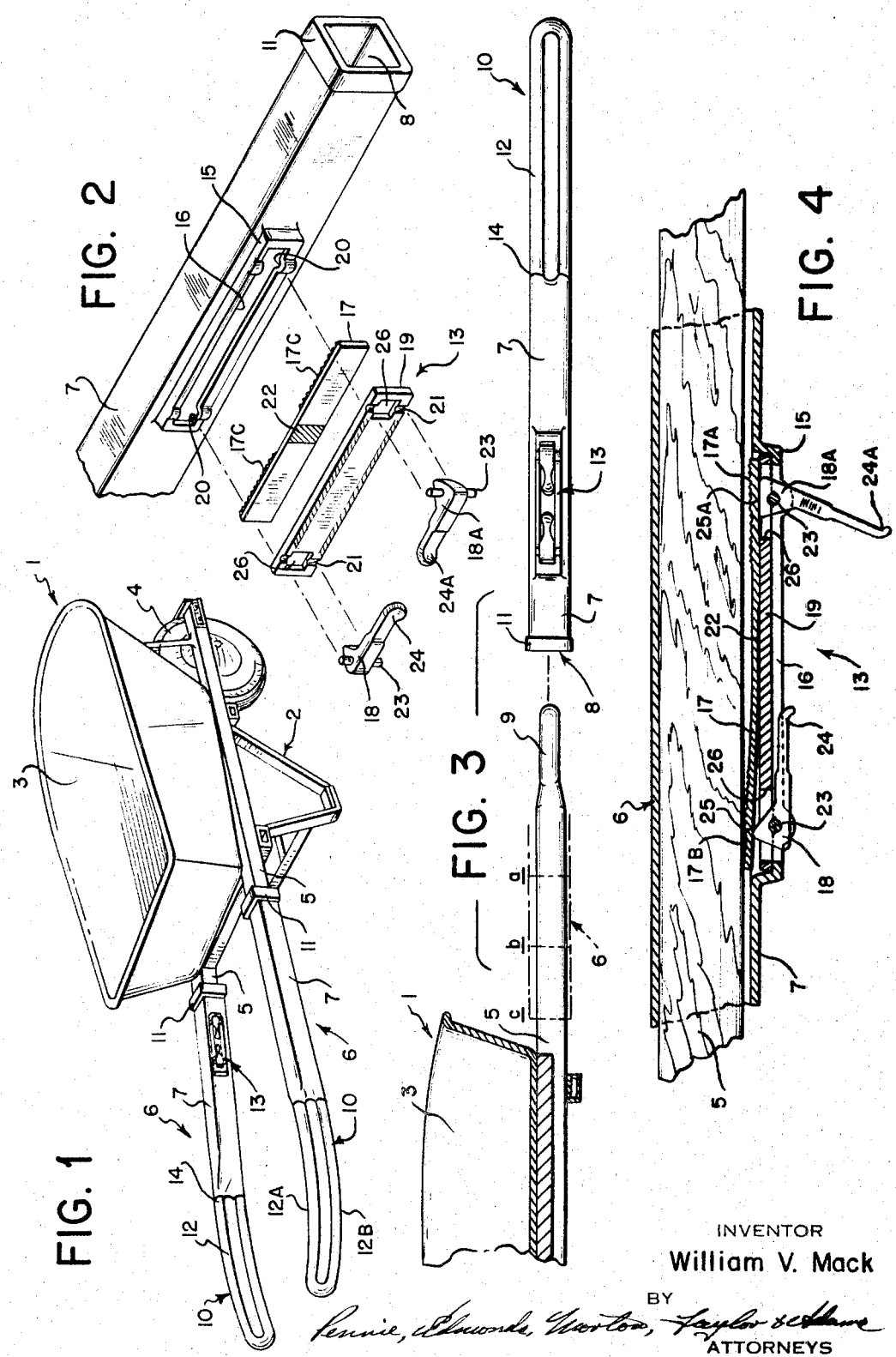
INVENTOR
William V. Mack
BY
Pennie, Edmonds, Morton, Taylor & Adams
ATTORNEYS United States Patent Office 3,404,427
Patented Oct. 8, 1968

3,404,427
ADJUSTABLE EXTENSION-HANDLE
William V. Mack, West Islip, N.Y., assignor to William V. Mack Inc., Bay Shore, N.Y., a corporation of New York
Filed Nov. 18, 1966, Ser. No. 595,386
12 Claims. (Cl. 16—114)

ABSTRACT OF THE DISCLOSURE

An extension-handle for attachment to a standard handle of a conveying vehicle such as wheelbarrow, the extension-handle including a sleeve part into which the standard handle is inserted to selected axial positions therein, a gripping part extending from the sleeve part, and a locking device for releasably fixing the extension-handle in its various axial positions, the locking device including a pressure plate driven into frictional contact with the standard handle within the sleeve.

---

This invention relates to extension-handles for attachment to the standard handles on conveying vehicles. More particularly, this invention concerns extension-handles for attachment to a wheelbarrow or handtruck to provide greater and variable overall handle length and variable leverage.

Conveying vehicles such as conventional wheelbarrows and handtrucks have handles of a fixed length, which length has been selected as convenient and functional for the average user and average load situation. Conveying vehicles of the type mentioned above usually have a frame with one or more wheels mounted near the front end and two spaced handles extending from the opposite end. In the case of handtrucks, the load to be carried would be placed upon the frame generally between the wheels and the handles; wheelbarrows are basically similar, but have a tub-shaped container mounted on the frame. Both types of apparatus illustrate the well-known principle of lever action whereby the contact point of the wheel on the ground is the fulcrum, the load which is being carried applies a downward force acting at a short distance from the fulcrum, and the user applies an upward force to the handles at a much greater distance from the fulcrum. The mechanical advantage gained (or the reduced effort required) by the operator is, of course, directly related to the length of these handles. Thus for an extremely heavy load, one could make a wheelbarrow having extremely long handles; however, such handles would be quite inconvenient and unnecessary for use with average loads.

In the prior art attempts have been made to provide variable-length handles on such conveying vehicles. In one case, each fixed-length handle extends from beneath the vehicle and is slidable from one closed position to one opened position. In another vehicle, the handle comprises a rod bent into an L-shape, having a vertical portion of the L extending from the vehicle and a horizontal portion of the L extending rearward to be gripped by the user. At the point of attachment to the vehicle, the vertical portion may be releasably moved to vary the height of the horizontal portion. As indicated above, varying the length of the handles has been achieved in the prior art by using specialy designed vehicles, which are not generally in use and are clearly more expensive. The present invention provides the advantage of variable-length handles for use on conventional, standard wheelbarrows and handtrucks without need of modification or special preparation to the standard vehicle. These extension-handles are positioned to establish any desired overall hande length as the load situation requires, and they can be removed by merely releasing a locking mechanism. The new extension-handles provide the additional advantage of an increased safety factor so that the user of a vehicle may extend the distance between himself and a dangerous cargo. Furthermore, the extension-handles are designed to provide a space between them sufficient for two men to operate the vehicle in tandem.

Broadly stated, this invention is an adjustable extension-handle for use with each standard handle of a conventional conveying vehicle, for varying the overall handle length and for varying the leverage as needed for each particular load. The extension-handle of this invention comprises an attachment portion which is engageable to the extending end of the standard handle at any axial position thereon and a gripping portion which extends from the attachment portion and defines an extension of the standard handle. A locking means is provided on the attachment portion for releasably fixing the axial position of the extension-handles upon the standard handle. In the presently preferred embodiment of this invention the extension-handle is composed of a hollow sleeve portion with one end open to be slid onto the end of a standard handle, and a gripping portion that extends rigidly from the end of the sleeve remote from the open end.

The preferred embodiment of the present invention is described in detail below, in conjunction with the accompanying drawings of which:

FIG. 1 is a side perspective view of a wheelbarrow with extension-handles attached;

FIG. 2 is a fragmentary perspective view of an extension-handle with an exploded view of the locking mechanism;

FIG. 3 is a fragmentary elevational view of a wheelbarrow in section, and the extension-handle positioned for attachment to the wheelbarrow, and FIG. 4 is a fragmentary plan view of the handle in section, showing one-half of the clamping mechanism engaged and the other half unengaged.

FIG. 1 shows a conventional wheelbarrow 1, comprising a frame 2, a tub 3 carried by the frame, a single wheel 4, and standard handles 5 extending rearward from the frame. Encasing each handle 5 is an extension-handle 6 of this invention, which comprises three basic parts as shown in all figures. There is a hollow sleeve part or portion 7 which is open at one end 8, a gripping portion 10 extending axially from the end of the sleeve opposite the open end, and a locking mechanism 13 on the side of the sleeve. In use, an extension-handle is held coaxially, rearward of a standard handle; then the extension-handle is moved forward until the end 9 of handle 5 becomes inserted into the open end 8 of sleeve 7.

FIG. 3 shows in dotted lines three specific axial position a, b, and c, that the extension-handle 6 may occupy; however, the user may select any axial position along the length of handle 5. As the handle 6 is moved from position c toward position a, both the overall handle length and the available leverage increase.

While standard handles shown in the figures are square in cross section, this invention will function with the conventional wheelbarrow handles having other cross-sectional shapes such as round, oval and rectangular. The sleeve 7 is fabricated from any suitable material strong enough to support the loads, as for example, metal formed into a thin-walled member to which the locking mechanism can be welded. Near the open end 8 is a collar 11 for additional strength. The inside cross-sectional dimensions of the sleeve are generally complementary to the corresponding dimensions of handle 5, so that attachmen can be executed easily without binding, while still maintaining a relatively close and supporting fit.

The gripping portion 10 of the extension-handle is formed from a rod 12 which is bent into a U-shape to provide high and low gripping bars, 12A and 12B respectively; the open end of the U is inserted into and fixedly attached to one end of the sleeve which has been tapered and rounded for a smooth joint 14. The gripping portions of the extension-handles are curved slightly as shown in the drawings, which serves a dual purpose. In the conventional wheelbarrow, the standard handles diverge as they extend rearward. If the extension-handles extended coaxially with the existing handles, the divergence might cause the grips, when fully extended, to be inconveniently far apart for a particular user. Hence, the inward curve reduces the spacing. The grips on the free ends thereof are laterally displaced from the axis of the sleeve, so that by axially revolving the extension-handles, the height of the grips relative to the vehicle frame or the spacing between the grips can be varied.

When the overall length of the wheelbarrow handle has been selected by moving each extension-handle to a particular axial position, the locking mechanism 13 is actuated to fix this length. A locking assembly 13 is shown on the inside wall of sleeve 7 in each of the figures. This assembly is quite simple, with its components best shown in the exploded view of FIG. 2 and the assembly of FIG. 4. Encasing the locking mechanism is a housing or frame 15 which is either formed as an integral part of the sleeve's side wall, or is a separately attached part, and includes a wall having inner and outer faces and a rectangular opening 16 therethrough. Within the housing are a pressure plate 17, the ends of which deflect to be in frictional contact with handles, cams 18 and 18A which bear against the pressure plate causing the deflection, and pivot plate 19 which participates in supporting the pressure plate and the cams. Near each end of the frame and near each end of the pivot plate is a pair of grooves, 20 and 21. The pivot plate 19 and pressure plate 17 are welded together at an area 22 midway between their ends. These joined plates are mounted or welded within the frame 15, with grooves 21 on pivot plate and grooves 20 on the frame aligned, each groove forming one half of the cylindrical bearing surface in which a cam axle 23 can pivot. At each end of the pivot plate 19, adjacent the grooves 21, is an opening 26 through which the cam pivots to contact the pressure plate. It should be apparent that the cams may be mounted directly in the frame or on the sleeve in standard bearings, without forming bearings from separate parts.

The cams 18 and 18A are metal castings, but may be formed from other rigid materials. Projecting axially from each cam are the pivot axles 23 which may be integral thereto, or may be separate steel pivot pins inserted for better wearing characteristics. From each cam an arm 24 or 24A extends as a long lever for rotating the cam to apply force against the pressure plate at contact regions 25 and 25A. In the engaged position each lever is partialy within the housing opening 16 and is substantially flush with the housing's outer face.

In FIG. 4 the handle 5 is shown within the sleeve 7. For the purpose of clarity, the locking mechanism 13 is shown with cam 18 in the engaged and locked position and cam 18A in the open position. Obviously, both cams would be open prior to attachment and both closed after attachment. With the cams in the unengaged position as represented by the cam 18A of FIG. 4 the cooperating end 17A of the pressure plate is consequently undeflected and occupies a position generally parallel to the pivot plate and not in contact with handle 5. Cam 18 in FIG. 4 is shown as being pivoted to a clamping position causing the end 17B of the pressure plate to be fully deflected to bear against the handle in gripping relationship therewith. Plate 17 is made of resilient spring steel to insure that the deflected portion thereof will return to the parallel position when not engaged. Thus there is no interference to movement of handle 5 within the sleeve until the locking mechanism is fully engaged.

To make the locking mechanism more reliable for restraining the extension-handle in the selected position, the surfaces of the pressure plate which contact the handle are roughened to have a greater coefficient of friction. In this preferred embodiment, a plurality of small teeth 17C extend outward from the surface. Alternatively, the surface might be knurled, or a friction material adhered thereto.

The above description of the present invention is of the presently preferred constuction; and it is to be understood that various changes thereto may be made without departing from the scope of the invention as set forth in the following claims.

I claim:
1. An adjustable extension-handle for attachment to one of the standard handles extending from conveying vehicles such as wheelbarrows and handtrucks, comprising:
 (a) an attachment part which includes a hollow sleeve part having one end open and having cross-sectional inside dimensions generally complementary to the corresponding outside dimensions of the standard handle which is insertable into the open end of the sleeve to selected axial positions therein,
 (b) a gripping part extending from the end of the sleeve remote from the open end thereof, and
 (c) locking means carried by the sleeve part for releasably fixing said axial positions of the extension, comprising:
  (i) a frame on the sleeve including a wall part having outer and inner faces ad an opening therethrough,
  (ii) a pressure plate disposed generally adjacent said inner face of the wall, part of the plate secured to the frame and part being deflectable to bear in frictional contact against a standard handle inserted into the sleeve, and
  (iii) actuation means comprising a cam part pivotable about an axle and a lever part extendable through said wall opening for actuation by an operator, a portion of said inner face being an outer bearing surface for said axle, and the cam being operatively engageable to the deflectable part of said pressure plate.

2. An extension-handle as defined in claim 1 wherein the lever part of said actuation means, when in engaged position, is partially within said wall opening and substantially flush therewith.

3. An extension-handle as defined in claim 1 wherein said locking means further comprises a pivot plate disposed between and secured to the wall's inner face and the pressure plate, a portion of the pivot plate adjacent the wall's bearing surface being a complementary bearing surface, the two bearing surfaces providing a generally cylindrical bearing for said cam's axle, the pivot plate also including an opening through which the cam extends.

4. An extension-handle as defined in claim 3 further comprising a second locking means similar to and spaced from the first.

5. An adjustable extension-handle according to claim 1 wherein the gripping means comprises a metal rod in a U-shape, the open end of the U being attached to the end of the sleeve remote from the open end.

6. An adjustable extension-handle according to claim 1 wherein each gripping portion has its free end laterally displaced from the sleeve axis, and the extension-handle is securable on the standard handle in selected positions of axial rotation.

7. An adjustable extension-handle according to claim 1 wherein the surface of the pressure plate that contacts the standard handle is roughened to establish a greater coefficient of friction.

8. An adjustable extension-handle according to claim 1 wherein a plurality of teeth extend outward from the friction-contact surface of the pressure plate.

9. An adjustable extension-handle according to claim 1 wherein the pressure plate is made of a resilient metal, the cam causing the pressure plate to deflect for said frictional contact, and the resilience of the metal causing the deflected plate to return to its normal position when the cam is unactuated.

10. An adjustable extension-handle according to claim 1 wherein the sleeve has a generally rectangular cross-section.

11. An extension-handle according to claim 9 wherein:
(a) the locking means further comprises a pivot plate having near one end an opening normal to the plane thereof and having a groove bearing surface on one face thereof,
(b) the frame has a groove bearing surface corresponding to that in the pivot plate,
(c) the pressure plate and pivot plate are disposed with their planes parallel, the opening in the pivot plate being adjacent the deflectable part of the pressure plate and the two plates being fixedly joined at an area spaced from the opening,
(d) the joined plates are disposed within the frame, the pivot plate being fixedly attached to the frame with their respective groove surfaces being in registry and forming a cylindrical bearing, and
(e) the cam has a shaft portion pivotally mounted in the cylindrical bearing, a portion of the cam extending through the opening in the pivot plate to contact and bear against the deflectable portion of the pressure plate.

12. An adjustable extension-handle according to claim 11 wherein:
(a) the pressure plate, the frame, and the pivot plate have similar rectangular dimensions,
(b) the pivot plate has a second opening which is identical to the first and is located at the opposite end of the pivot plate,
(c) the pressure plate and pivot plate are attached at an area intermediate their ends,
(d) the bearing surfaces of the frame conform to those of the pivot plate, and
(e) a second cam is mounted to extend through the second opening and cause deflection of a second portion of the pressure plate.

References Cited

UNITED STATES PATENTS

| | | | |
|---|---|---|---|
| 1,096,630 | 5/1914 | Koehler | 280—47.17 |
| 1,441,144 | 1/1923 | Cutler | 280—47.37 XR |
| 1,829,467 | 10/1931 | Atkinson | 16—114 |
| 1,918,519 | 7/1933 | Clements | 287—58 |
| 1,965,409 | 7/1934 | Forrer | 280—47.31 |
| 2,652,736 | 9/1953 | Kiene | 16—114 |
| 2,817,548 | 12/1957 | Uthemann | 287—58 |
| 2,849,249 | 8/1958 | Fridolph | 287—58 |

FOREIGN PATENTS 909,535 7/1949 Germany.

BENJAMIN HERSH, *Primary Examiner.*

L. D. MORRIS, JR., *Assistant Examiner.*